United States Patent
Nagasaka

(10) Patent No.: US 10,289,902 B2
(45) Date of Patent: May 14, 2019

(54) DATA ANALYSIS DEVICE, DATA ANALYSIS METHOD AND STORAGE MEDIUM

(71) Applicant: CASIO COMPUTER CO., LTD., Shibuya-ku, Tokyo (JP)

(72) Inventor: Tomoaki Nagasaka, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 173 days.

(21) Appl. No.: 15/185,611

(22) Filed: Jun. 17, 2016

(65) Prior Publication Data
US 2016/0370401 A1    Dec. 22, 2016

(30) Foreign Application Priority Data

Jun. 18, 2015    (JP) ................. 2015-122845

(51) Int. Cl.
G06K 9/00    (2006.01)
(52) U.S. Cl.
CPC ................. G06K 9/00342 (2013.01)
(58) Field of Classification Search
CPC .................................... G06K 9/00342
USPC ...................................... 702/141
See application file for complete search history.

(56) References Cited

U.S. PATENT DOCUMENTS

| | | | |
|---|---|---|---|
| 5,367,463 A | 11/1994 | Tsuji | |
| 7,254,516 B2 | 8/2007 | Case et al. | |
| 7,603,255 B2 | 10/2009 | Case et al. | |
| 8,086,421 B2 | 12/2011 | Case et al. | |
| 8,112,251 B2 | 2/2012 | Case et al. | |
| 8,560,235 B2 | 10/2013 | Okuyama et al. | |
| 8,781,776 B2 | 7/2014 | Onda et al. | |
| 2006/0136173 A1 | 6/2006 | Case et al. | |
| 2007/0287596 A1 | 12/2007 | Case et al. | |

(Continued)

FOREIGN PATENT DOCUMENTS

| | | |
|---|---|---|
| JP | 05018774 A | 1/1993 |
| JP | H08233584 A | 9/1996 |

(Continued)

OTHER PUBLICATIONS

Japanese Office Action (and English language translation thereof) dated Mar. 14, 2019 issued in Japanese Application No. 2015-122845.

Primary Examiner — Ricky Ngon
(74) Attorney, Agent, or Firm — Holtz, Holtz & Volek PC

(57) ABSTRACT

The present invention includes a sensor device which is worn on a user's body, acquires and outputs positioning data including geographical position information of the moving user, and measures and outputs motion data regarding the motion status of the body, a wrist device which controls the operation of the sensor device, and a data processing section which obtains a first movement track indicating the user's positional change based on the positioning data outputted from the sensor device and a second movement track indicating a relative change of the user's position based on the motion data, deforms the second movement track based on a comparison between the positions of the first movement track and the second movement track at the same clock time in the first movement track and the second movement track, and obtains the user's moving distance from a track after the deformation processing on the second movement track.

10 Claims, 18 Drawing Sheets

(56) References Cited

U.S. PATENT DOCUMENTS

| | | |
|---|---|---|
| 2009/0319230 A1 | 12/2009 | Case et al. |
| 2010/0210421 A1 | 8/2010 | Case et al. |
| 2010/0302099 A1* | 12/2010 | Grossnickle ............ G01S 19/09 342/357.46 |
| 2011/0257920 A1 | 10/2011 | Onda et al. |
| 2011/0313716 A1* | 12/2011 | Smid .................... G01C 21/165 702/141 |
| 2012/0078396 A1 | 3/2012 | Case et al. |
| 2013/0030931 A1* | 1/2013 | Moshfeghi .............. G01S 19/48 705/16 |
| 2013/0128022 A1* | 5/2013 | Bose ........................ H04N 7/18 348/77 |
| 2014/0073481 A1 | 3/2014 | Aibara et al. |
| 2014/0125414 A1 | 5/2014 | Chen et al. |

FOREIGN PATENT DOCUMENTS

| | | |
|---|---|---|
| JP | 10318777 A | 12/1998 |
| JP | 3460400 B2 | 10/2003 |
| JP | 2008524589 A | 7/2008 |
| JP | 2010122034 A | 6/2010 |
| JP | 2011017599 A | 1/2011 |
| JP | 2011220844 A | 11/2011 |
| JP | 2012098137 A | 5/2012 |
| JP | 2014054303 A | 3/2014 |
| WO | 2006065679 A2 | 6/2006 |
| WO | 2006065679 A3 | 9/2006 |

* cited by examiner

FIG. 3

| | ANALYZE | IMPORT | EXPORT | EDIT SEARCH ITEM | EDIT RUNNER | IMPORT (LOG) | | | |
|---|---|---|---|---|---|---|---|---|---|
| READ LOG | | | | | | IMPORT | | SELECT ALL | OVER-WRITE ☐ APPLY PREVIOUS ☐NEW ☐ CUTOUT POSITION |
| [NUM-BER] | | [LOG END TIME] | [DATA SIZE] | [RUNNER NAME] | [TRAIN-ING] | [RUNNING DISTANCE] | [PACE] | [COURSE] | [NUMBER OF TRIALS] |
| ▶ 001 | ☑ | 20130822 1136 | 6666844 | RUNNER0 ☑ | INTERVAL ☑ | 300m | ☑ OVERSPEED ☑ | TRACK ☑ | 5 |

| | COMMENT |
|---|---|
| ▶ TRIAL 1 | 300m × 5 1ST TRIAL |
| TRIAL 2 | 300m × 5 2ST TRIAL |
| TRIAL 3 | 300m × 5 3ST TRIAL |
| TRIAL 4 | 300m × 5 4ST TRIAL |
| TRIAL 5 | 300m × 5 5ST TRIAL |

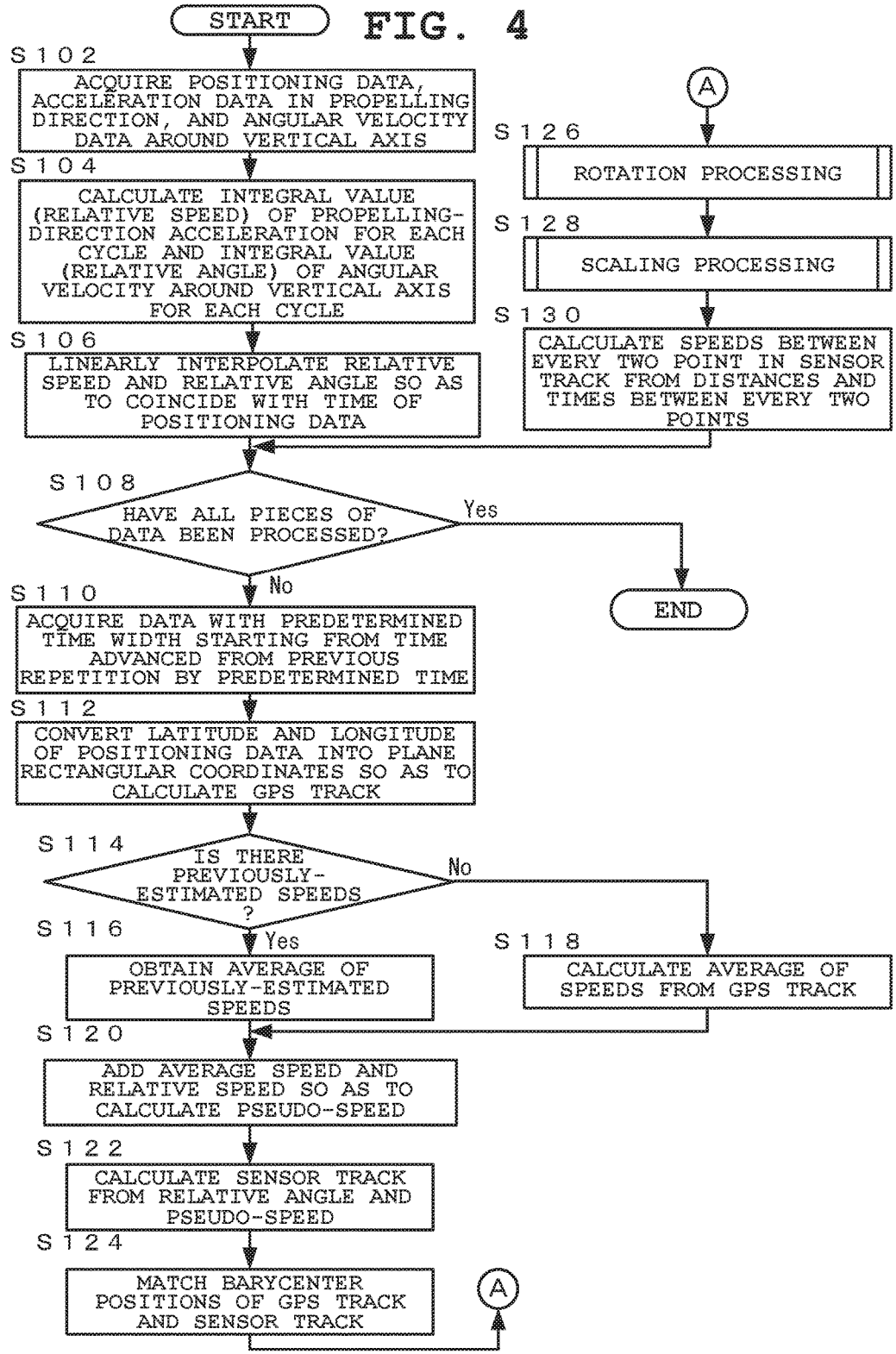

DATA ANALYSIS DEVICE, DATA ANALYSIS METHOD AND STORAGE MEDIUM

CROSS-REFERENCE TO RELATED APPLICATION

This application is based upon and claims the benefit of priority from the prior Japanese Patent Application No. 2015-122845, filed Jun. 18, 2015, the entire contents of which are incorporated herein by reference.

BACKGROUND OF THE INVENTION

1. Field of the Invention

The present invention relates to a data analysis device, a data analysis method, and a storage medium for grasping the motion status (exercise status) of a human body at the time of exercise.

2. Description of the Related Art

In recent years, because of rising health consciousness, more and more people are performing daily exercises, such as running, walking, and cycling, to maintain their wellness or improve their health condition. In addition, an increasing number of people are aiming to participate in competitions, such as marathon events, through these daily exercises. These people are highly conscious of and interested in measuring and recording their various biological information and exercise information by using numerical values or data so as to grasp their health conditions and exercise status. These people aiming to participate in a race have an objective of achieving a successful record in the race, and therefore are very conscious of and interested in efficient and effective training methods.

To accurately grasp their own health conditions and exercise status, it is effective to generate specific information as indexes based on numerical values and data measured during exercise and visually present the specific information. For example, to quantitatively evaluate running conditions and forms, information regarding running speed can be used as an important and basic index. Here, as a method for measuring a running speed during a running exercise or marathon, for example, a method is known in which positioning data by acquired GPS (Global Positioning System) is used to calculate a speed from a distance and required time between two points. For example, Japanese Unexamined Patent Application (Kohyo—Translation of PCT Application) Publication No. 2008-524589 discloses a technique in which a user's moving distance and moving speed are calculated based on data regarding user's position points with time stamps acquired from GPS signals received by a GPS receiving device worn on the body and are provided in association with a route displayed on a map.

In the above-described method of calculating the moving distance and moving speed of a human body using positioning data by GPS, high accuracy and precision of positioning data are required to be ensured. However, since positioning by GPS is greatly affected by surrounding environment, accurate positioning cannot be performed at locations where reception of GPS signals is difficult such as, for example, an area between buildings and outdoors, and an error in positioning data may be increased. Moreover, in the GPS technical specifications currently open for consumer use, an error on the order of several to ten meters may be included even if positioning is performed in an ideal environment. In particular, in exercises such as a running exercise and marathon, although the runner's moving speed is slower compared with that of a vehicle or the like, it is desired to grasp details of changes in the speed in order to evaluate the exercise status during the running exercise and the like in detail. Therefore, in the calculation method simply using only positioning data by GPS, there are cases where the moving distance and moving speed of a human body cannot be accurately calculated, in which the user cannot accurately grasp his or her exercise status and therefore cannot sufficiently judge or improve the exercise status.

SUMMARY OF THE INVENTION

A data analysis device according to one embodiment is disclosed. It comprises: at least one processor; and a memory storing instructions that, when executed by the at least one processor, control the at least one processor to: obtain a first movement track indicating a change of a position of a user between two different clock times based on a positioning data and a second movement track indicating a relative change of the position of the user between the two different clock times based on a motion data, the positioning data and the motion data intermittently acquired and outputted by a sensor, the positioning data including geographical position information of the user when the user travels, the motion data relating a motion status of the body when the user travels; perform at least one of a rotation process, an enlargement process, and a reduction process on the second movement track as a deformation process, based on a comparison between positions in the first movement track and the second movement track at a certain clock time between the two clock times; and obtain, based on a track that obtained by perforating the deformation process on the second movement track, a moving distance of the user between the two clock times.

A non-transitory computer-readable storage medium storing instructions according to one embodiment is disclosed. The instructions, when executed by at least one processor, control the processor to: obtain a first movement track indicating a change of a position of a user between two different clock times based on a positioning data and a second movement track indicating a relative change of the position of the user between the two different clock times based on a motion data, the positioning data and the motion data intermittently acquired and outputted by a sensor, the positioning data including geographical position information of the user when the user travels, the motion data relating a motion status of the body when the user travels; perform at least one of a rotation process, an enlargement process, and a reduction process on the second movement track as a deformation process, based on a comparison between positions in the first movement track and the second movement track at a certain clock time between the two clock times; and obtain, based on a track that obtained by performing the deformation process on the second movement track, a moving distance of the user between the two clock times.

A data analysis system according to one embodiment is disclosed. It comprises: a data analysis device comprising: at least one processor; and a memory storing instructions that, when executed by the at least one processor, control the at least one processor to: obtain a first movement track indicating a change of a position of a user between two different clock times based on a positioning data and a second movement track indicating a relative change of the position of the user between the two different clock times based on a motion data, the positioning data and the motion data intermittently acquired and outputted by a sensor, the positioning data including geographical position information of the user when the user travels, the motion data relating a motion status of the body when the user travels; perform at least one of a rotation process, an enlargement process, and a reduction process on the second movement track as a deformation process, based on a comparison between positions in the first movement track and the second movement track at a certain clock time between the two clock times; and obtain, based on a track that obtained by performing the deformation process on the second movement track, a moving distance of the user between the two clock times.

A data analysis method according to one embodiment is disclosed. It comprises: obtaining a first movement track indicating a change of a position of a user between two different clock times based on a positioning data and a second movement track indicating a relative change of the position of the user between the two different clock times based on a motion data, the positioning data and the motion data intermittently acquired and outputted by a sensor, the positioning data including geographical position information of the user when the user travels, the motion data relating a motion status of the body when the user travels; performing at least one of a rotation process, an enlargement process, and a reduction process on the second movement track as a deformation process, based on a comparison between positions in the first movement track and the second movement track at a certain clock time between the two clock times; and obtaining, based on a track that obtained by performing the deformation process on the second movement track, a moving distance of the user between the two clock times.

BRIEF DESCRIPTION OP THE DRAWINGS

The present invention can be more deeply understood by the detailed description below being considered together with the following drawings.

FIG. 3 is a display example showing one example of a sensor data transfer procedure in a control method (data analysis method) for the exercise supporting apparatus according to the embodiment;

FIG. 4 is a flowchart of one example of the control method for the exercise supporting apparatus according to the embodiment;

DETAILED DESCRIPTION OF THE PREFERRED EMBODIMENTS

A data analysis device, a data analysis method, and a storage medium according to the present invention will hereinafter be described in detail with reference to embodiments. Note that, in the following descriptions of the embodiments, a case is exemplified in which a data analysis device according to the present invention is applied in an exercise supporting apparatus, and a running speed is estimated based on various data (sensor data) collected while a user is running a predetermined running course, marathon course, or the like, and is provided to the user.

<Exercise Supporting Apparatus>

Figure 1:
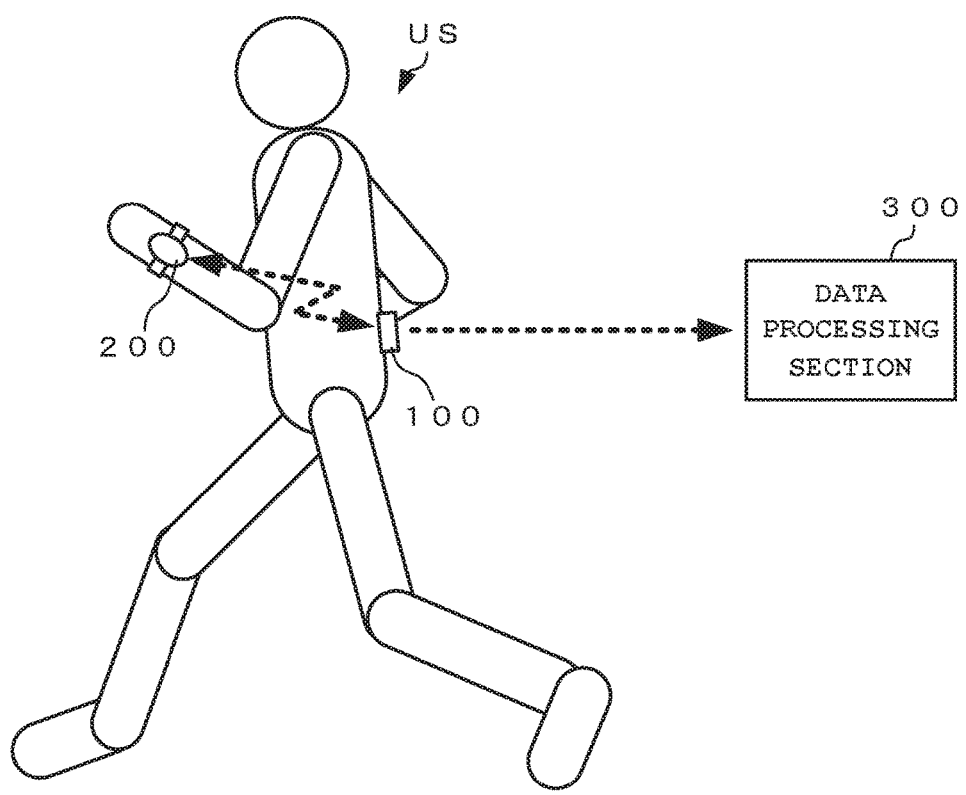
FIG. 1 is a schematic structural diagram showing an embodiment of an exercise supporting apparatus in which a data analysis device according to the present invention has been applied.
Figure 2A:
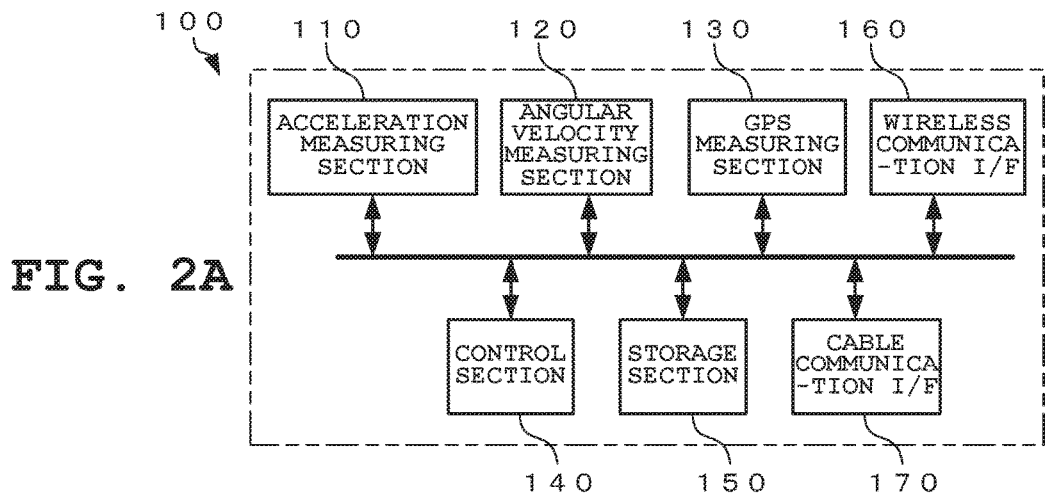
FIG. 2A to FIG. 2C are schematic block diagrams showing the structures of a sensor device, a wrist device, and the data analysis device, respectively, applied in the exercise supporting apparatus according to the embodiment.
Figure 2B:
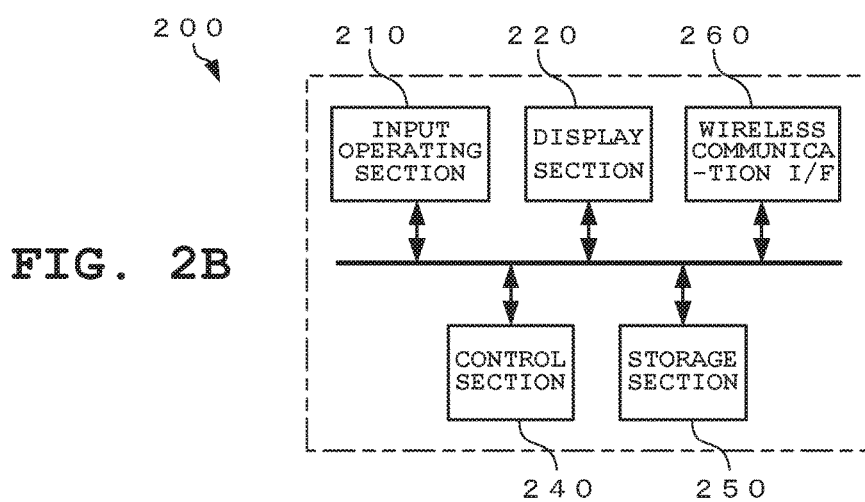
Figure 2C:
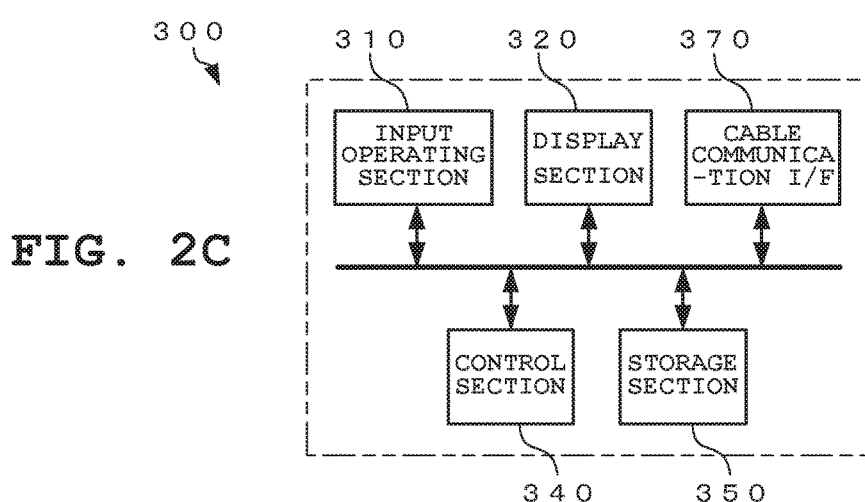

FIG. 1 is a schematic structural diagram showing an embodiment of an exercise supporting apparatus in which a data analysis device according to the present invention has been applied. FIG. 2A to FIG. 2C are schematic block diagrams showing the structures of a sensor device, a wrist device, and the data analysis device, respectively, applied in the exercise supporting apparatus according to the embodiment.

The exercise supporting apparatus according to the embodiment of the present invention, for example, includes a sensor device (sensor section) 100 that in worn on the waist of a user US on the back side and travels with the user US when the user US travels, a control device (hereinafter referred to as "wrist device") 200 that is worn on a wrist or the like of the user US and also travels with the user US when the user US travels, and a data processing section 300 which analyzes sensor data outputted from the sensor device 100 and provides indexes associated with an exercise status during a running exercise to the user US in a predetermined display format, as depicted in FIG. 1.

The sensor device 100 has a motion sensor which measures various pieces of motion data regarding the motion statuses of a human body performing an exercise (running)

involving movements such as a running exercise or a marathon, and has a function for intermittently measuring and outputting motion data for each predetermined elapsed time by the motion sensor. Here, FIG. 1 shows a structure in which the sensor device 100 has been worn on the waist of the user US, so that the sensor device 100 travels with the user US when the user US travels. However, the present invention is not limited thereto, and the sensor device 100 may be worn on any portion on a body axis passing through the center of a human body or a nearby portion. For example, the sensor device 100 may be worn on a chest, neck, abdomen, or the like. Also, the method for wearing the sensor device 100 on the human body is not particularly limited, and various wearing methods can be adopted, such as a method where the sensor device 100 is clipped on exercise clothes, a method where the sensor device 100 is taped, and a method where the sensor device 100 is wound around a body by a belt.

Specifically, the sensor device 100 includes, for example, an acceleration measuring section 110, an angular velocity measuring section 120, a GPS measuring section 130, a control section 140, a storage section 150, a wireless communication interface section (hereinafter referred to as "wireless communication I/F") 160, and a cable communication interface section (hereinafter referred to as "cable communication I/F") 170, as depicted in FIG. 2A.

The acceleration measuring section (acceleration sensor) 110 measures the change ratio of the motion speed (acceleration) of the running user US. This acceleration measuring section 110, which has a triaxial acceleration sensor, detects acceleration components (acceleration signals) in three axial directions orthogonal to one another, and outputs them as acceleration data. Also, the angular velocity measuring section (angular velocity sensor) 120 measures the change of the motion direction (angular velocity) of the running user US. This angular velocity measuring section 120, which has a triaxial angular velocity sensor, detects angular velocity components (angular velocity signals) occurred in the rotational directions of rotational motions around the three axes that ore orthogonal to each other and defining the above-described acceleration data, and outputs them as angular velocity data. The GPS measuring section (positioning sensor) 130 receives radio waves from a plurality of GPS satellites via a GPS antenna (omitted in the drawings), and thereby intermittently acquires and outputs positioning data including geographical position information based on latitude and longitude information for each predetermined elapsed time. Note that, in addition to the above-described acceleration measuring section 110, the angular velocity measuring section 120, and the GPS measuring section 130, the sensor device 100 may include means which measures an azimuth, such as a geomagnetic sensor. Here, in the following descriptions, the motion data and the positioning data are collectively referred to as sensor data.

The control section 140 is an arithmetic processing device having a clock function, such as a CPU (Central Processing Unit) or MPU (microprocessor). By performing a predetermined control program, the control section 140 controls various operations, such as sensing operations in the acceleration measuring section 110, the angular velocity measuring section 120, and the GPS measuring section 130, an operation of storing/reading data to and from the storage section 150 described later, and an operation of communicating with an external device by the wireless communication I/F 160 and the cable communication I/F 170.

The storage section 150 stores sensor data (acceleration data, angular velocity data, and positioning data) outputted from the acceleration measuring section 110, the angular velocity measuring section 120, and the GPS measuring section 130 in a predetermined storage area, in association with time data. Note that the storage section 150 may be partially or entirely in a form of a removable storage medium such as a memory card may be structured to be removable from the sensor device 100.

The wireless communication I/F 160 performs communication with at least the wrist device 200 described later, and thereby receives an instruction signal for instructing to start or end the logging of sensor data outputted from the acceleration measuring section 110, the angular velocity measuring section 120, and the GPS measuring section 130. As a result, the sensor data acquired during the logging operation is stored in time series in the predetermined storage area of the storage section 150. Note that, as a method for transmitting and receiving various types of signals between the sensor device 100 and the wrist device 200 in the wireless communication I/F 160, various types of wireless communication methods such as Bluetooth (registered trademark) and Wi-Fi (Wireless Fidelity (registered trademark)) can be adopted.

The cable communication I/F 170 has at least a function for transmitting sensor data stored in the storage section 150 to the data processing section 300 described later. As a result, in the data procession section 300, predetermined data analysis processing including index estimation processing for estimating the movement track and moving speed of the user US is performed. Note that, as a method for transferring sensor data to the data processing section 300 from the sensor device 100 in the cable communication I/F 170, various types of cable communication methods via a USB (Universal Serial Bus) standard communication cable (USB cable) and the like can be adopted. Also, as a method for transferring sensor data from the sensor device 100 to the data processing section 300, the above-described wireless communication I/F 160 may be used. In this case, in addition to the above-described Bluetooth communication and WiFi communication, a non-contact-type communication method using Near Field Communication (NFC) technology may be adopted. Also, as still another method for transferring sensor data from the sensor device 100 to the data processing section 300, a method may be adopted in which the insertion of a removable storage medium such as a memory card is switched between the sensor device 100 and the data processing section 300.

The wrist device 200 is worn on a body part that is easily visually recognizable by the user US (for example, a wrist), and is connected to the sensor device 100 by using a predetermined wireless communication method. This wrist device 200 has a function for controlling the start or end of the logging of sensor data in the sensor device 100 and a function for causing various information to be displayed to the user US in a visually recognizable format. In FIG. 1, as this control device, a wristwatch (or wristband) type that is worn on a wrist of the user US is shown. However, the present invention is not limited thereto. For example, the control device may be a portable information terminal or dedicated terminal such as a smartphone, to be accommodated in a pocket or attached to an upper arm part. Also, it is not required to be a device separate from the sensor device 100, and may be the sensor device 100 having an operation switch on its main body for instructing to start or end logging.

Specifically, the wrist device 200 includes, for example, an input operating section 210, a display section 220, a control section 240, a storage section 250, and a wireless communication I/F 260, as depicted in FIG. 2B.

The input operating section 210 is input means, such as a button switch provided on the housing of the wrist device 200 or a touch panel or the like provided on the front surface of the display section 220 described later. This input operating section 210 is used when, for example, an instruction for starting or ending the logging of sensor data in the sensor device 100 is given, desired information or the like is displayed on the display section 220, or various settings are performed. The display section 220 at least displays related information when an input operation is performed by using the input operating section 210. Note that the display section 220 may have a function for displaying (or notifying of) sensor data acquired by the sensor device 100, the operating status of the sensor device 100, time information, and the like.

The control section 240 executes a predetermined control program, and thereby controls various operations, such as a display operation by the display section 220, a data storing/reading operation to and from the storage section 250, and a communication operation by the wireless communication I/F 260. The storage section 250 stores, in a predetermined storage area, at least information for display on the display section 220 and various information and data to be transmitted to and received from the sensor device 100 via the wireless communication I/F 260.

The wireless communication I/F 260 performs communication with the sensor device 100 by using the above-described predetermined wireless communication method, and thereby transmits, to the sensor device 100, an instruction signal for instructing to start or end the logging of sensor data in the sensor device 100 set by operating the input operating section 210, and the like.

To the data processing section 300, various sensor data measured and accumulated by the sensor device 100 while the user US is running are transferred after the end of exercise. The data processing section 300 has a function for estimating, based on the sensor data, a movement track and a moving speed (running speed) as indexes (exercise indexes) associated with the exercise status of the body, and providing the user US with these indexes. Here, the data processing section 300 may be a notebook or desktop personal computer or a portable information terminal such as a smartphone (high-functionality portable telephone) or tablet terminal as long as the data processing section 300 includes display means and has a function for executing a data analysis program described later. Also, in a case where the data analysis program is executed by using a cloud system on a network as depicted in a modification example described later, the data processing section 300 may be a communication terminal connected to the cloud system.

Specifically, the data processing section 300 includes, for example, an input operating section 310, a display section 320, a control section 340, a storage section 350, and a cable communication I/F 370, as depicted in FIG. 2C.

The input operating section 310 is input means such as a keyboard, mouse, touchpad, or touch panel annexed to the data processing section 300. Here, the input operating section 310 may include only one of these various input means or may include a plurality of input means. By the user US selecting an item or icon displayed on the display section 320 or designating a point being displayed on a screen by using the input operating section 310, a function corresponding to the item, icon, or point is performed. In particular, in the present embodiment, the input operating section 310 is used for an input operation to store sensor data transferred from the sensor device 100 in a predetermined storage area of the storage section 350 or select a training or trial to be analyzed from the sensor data stored in the storage section 350.

The display section (exercise data providing section) 320 has a display panel of, for example, a color-display-capable liquid-crystal type or light-emitting-element type such as organic EL elements, and at least displays related information at the time of an input operation by using the input operating section 310 or indexes estimated by the control section 340 such as a movement track and moving speed in a predetermined format, such as numerical values, a graph, a table, or a map.

The control section (movement track obtaining section, movement track deformation processing section, and movement distance obtaining section) 340 is an arithmetic processing device such as a CPU or MPU. In instead embodiments, the data processing section 300 may comprise two or more of the CPU or the MPU functions as the control section 340. By executing a predetermined control program, the control section 340 controls various operations, such as a display operation by the display section 320, a data storing/reading operation to and from the storage section 350 described later, and a communication operation of the cable communication I/F 370. Also, by executing a predetermined algorithm program, the control section 340 estimates indexes such as a movement track and a moving speed based on sensor data corresponding to a training or trial desired by the user US and causes the indexes to be displayed in a format such as numerical values, a graph, a table, or a map. Here, the control program and the algorithm program to be executed by the control section 340 may be previously incorporated inside the control section 340 or may be stored in the storage section 350. Note that a data analysis method according to the present embodiment will be described in detail further below.

The storage section 350 has at least one of a flash ROM (read-only memory) and a RAM (random access memory) and memorizes instructions which control the control section 340 when executed by the control section 340. The storage section 350 stores, in a predetermined storage area, sensor data transferred from the sensor device 100 via the cable communication I/F 370. Here, sensor data accumulated in the storage section 350 is stored in time series in association with, for example, a running method (such as a training menu) and course conditions (such as a course type, running distance, and corner angle). Note that sensor data to be accumulated in the storage section 350 may be specific to one user or for a plurality of users. Also, the storage section 350 stores indexes such as a movement track and moving speed estimated by the control section 340 executing a predetermined algorithm program and data for use in causing these indexes to be displayed on the display section 320 in a predetermined format. Note that the storage section 350 may be partially or entirely in a form of a removable storage medium such as a memory card, and may be structured to be removable from the data processing section 300.

The cable communication I/F 370 has a function for communicating with the sensor device 100 by applying the above-described predetermined cable communication method and thereby receiving sensor data transmitted from the sensor device 100 for transfer to the storage section 350.

Note that the data processing section 300 may include, in addition to or in place of the cable communication I/F 370, a wireless communication I/F that allows communication with the sensor device 100 by a wireless communication method so as to receive sensor data from the sensor device 100 via communication by the wireless communication method.

<Exercise Supporting Apparatus Control Method>

Next, a control method (data analysis method) for the exercise supporting apparatus according to the present embodiment is described with reference to the drawings.

Figure 5:
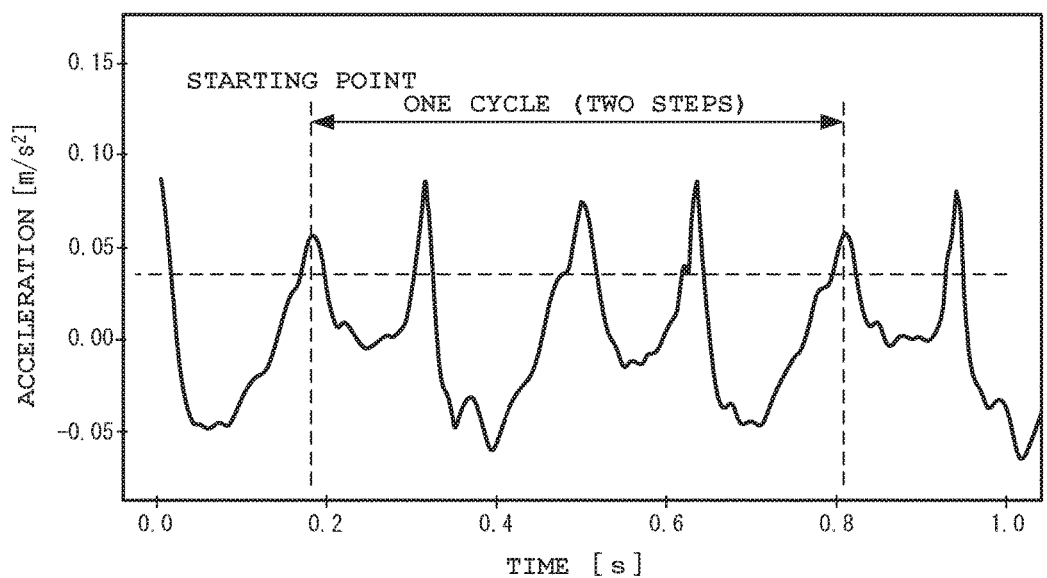
FIG. 5 is a schematic diagram for describing a definition of one cycle in the data analysis method according to the embodiment.
Figure 6:
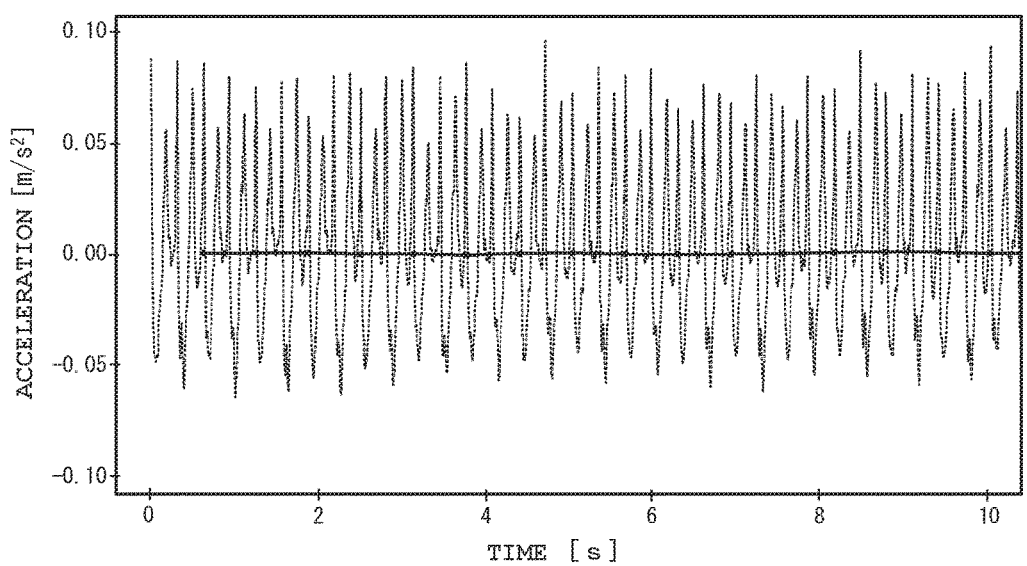
FIG. 6 is a schematic diagram for describing integral value calculation processing in the data analysis method according to the embodiment.
Figure 7:
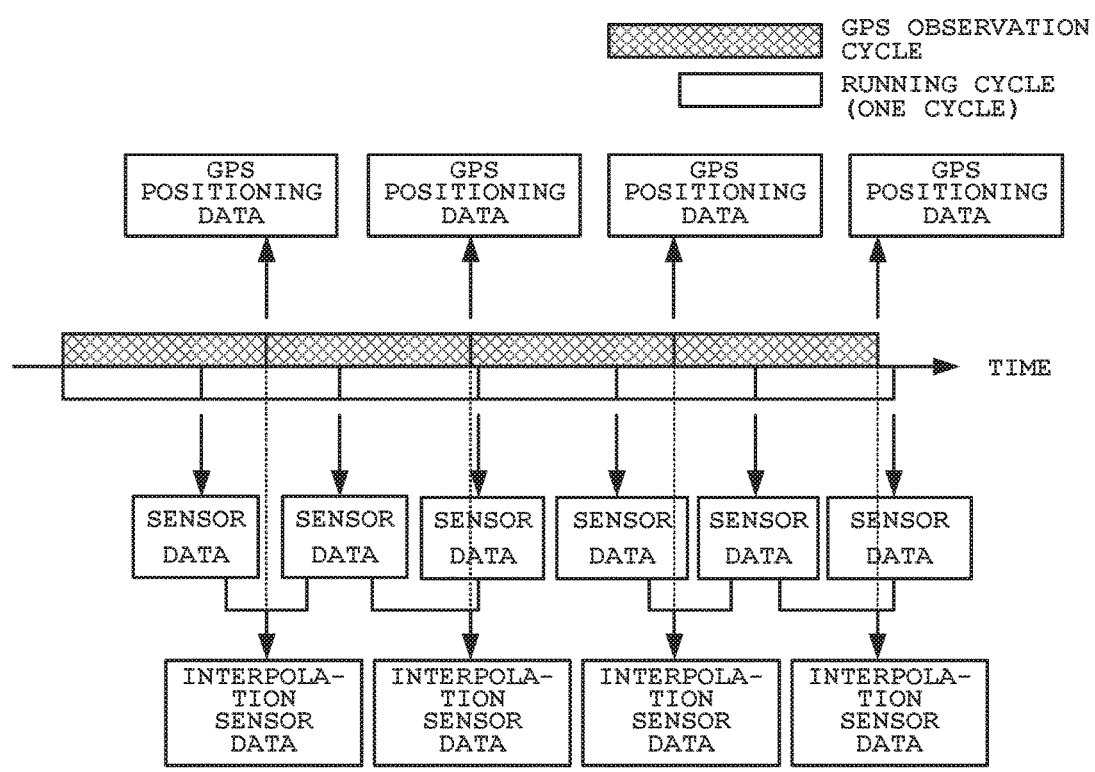
FIG. 7 is a schematic diagram for describing sensor data interpolation processing in the data analysis method according to the embodiment.
Figure 8:
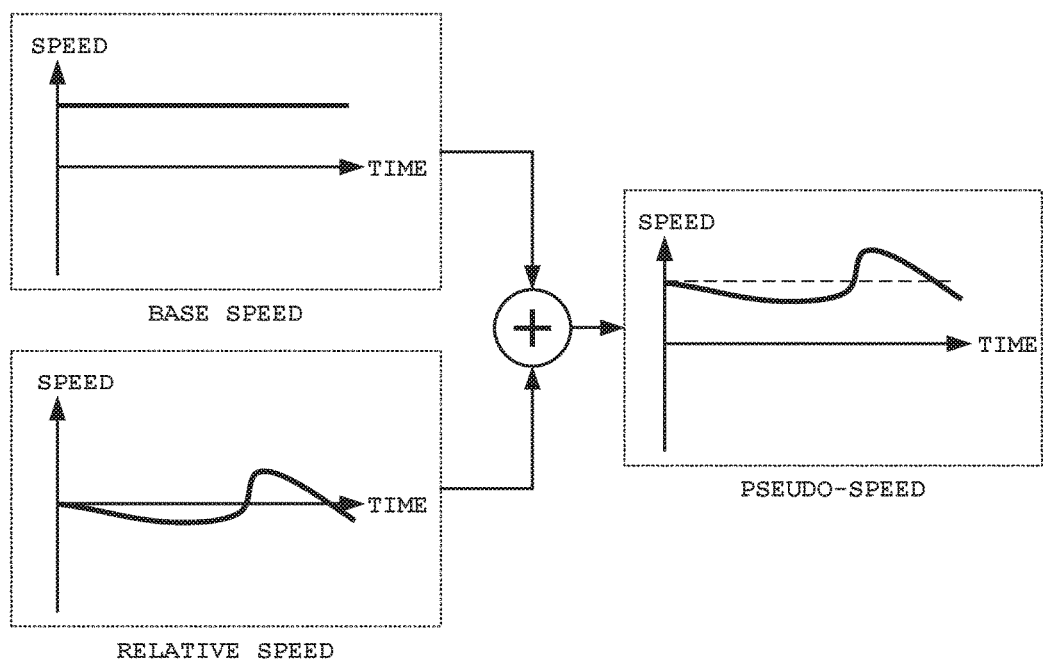
FIG. 8 is a schematic diagram for describing a method of obtaining a pseudo-speed in the data analysis method according to the embodiment.
Figures 9A, 9B:
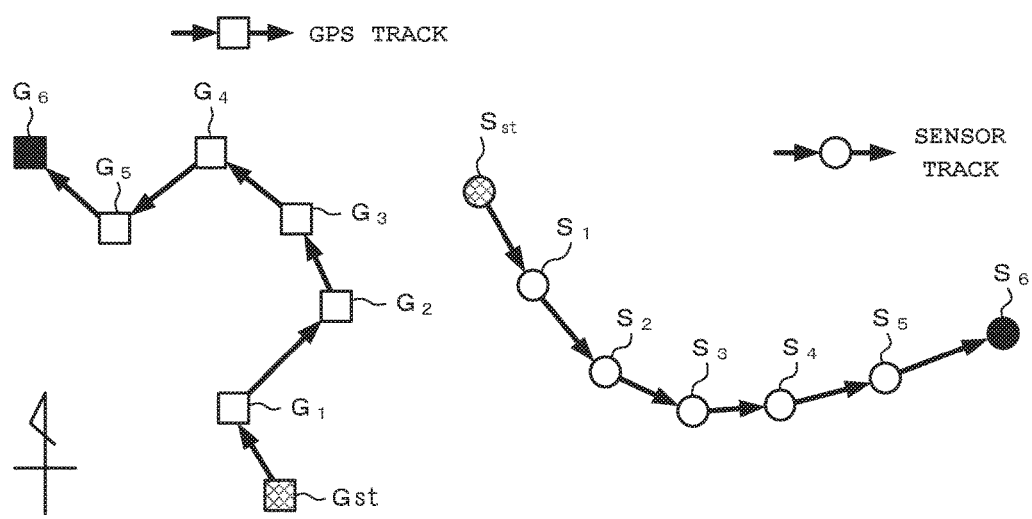
FIG. 9A and FIG. 9B are schematic diagrams showing examples of a GPS track and a sensor track in the data analysis method according to the embodiment.
Figure 10:
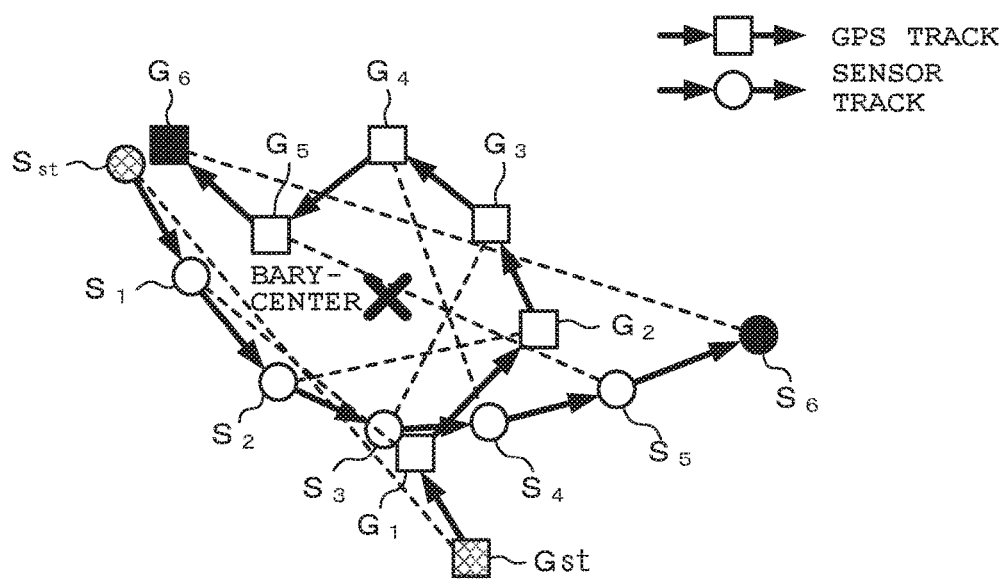
FIG. 10 is a schematic diagram of a state in which gravity positions of the GPS track and the sensor track coincide with each other, in the data analysis method according to the embodiment.
Figure 11:
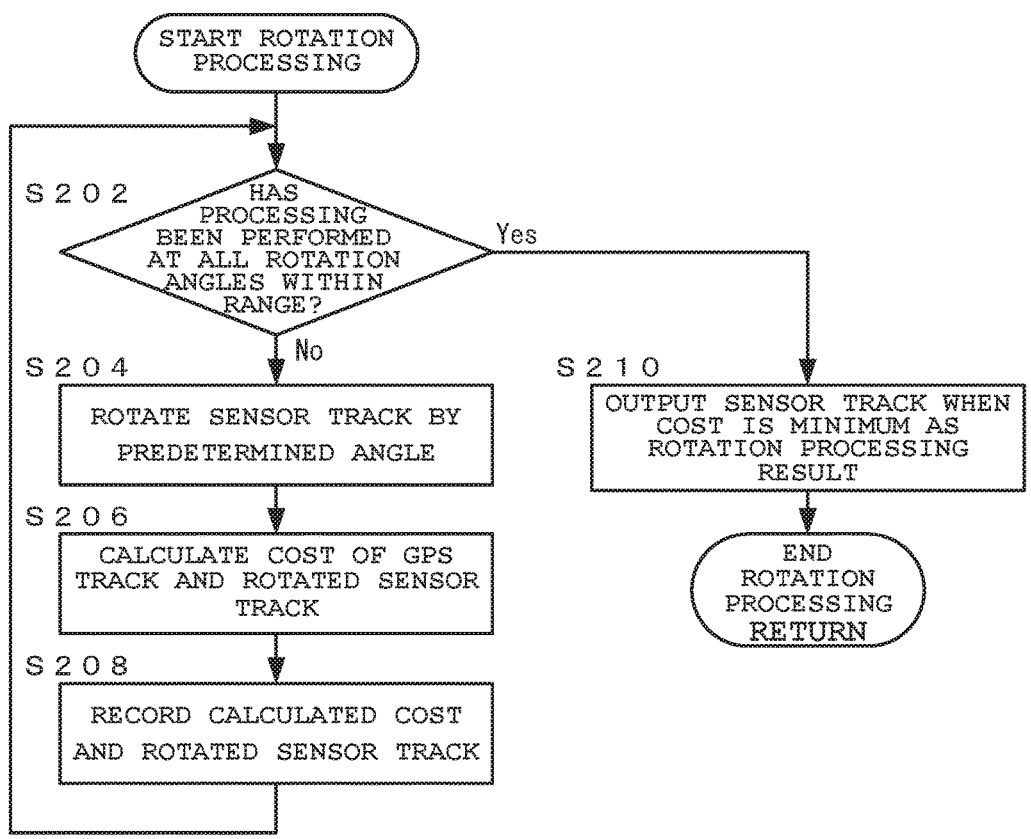
FIG. 11 is a flowchart of one example of sensor track rotation processing in the data analysis method according to the embodiment.
Figure 12:
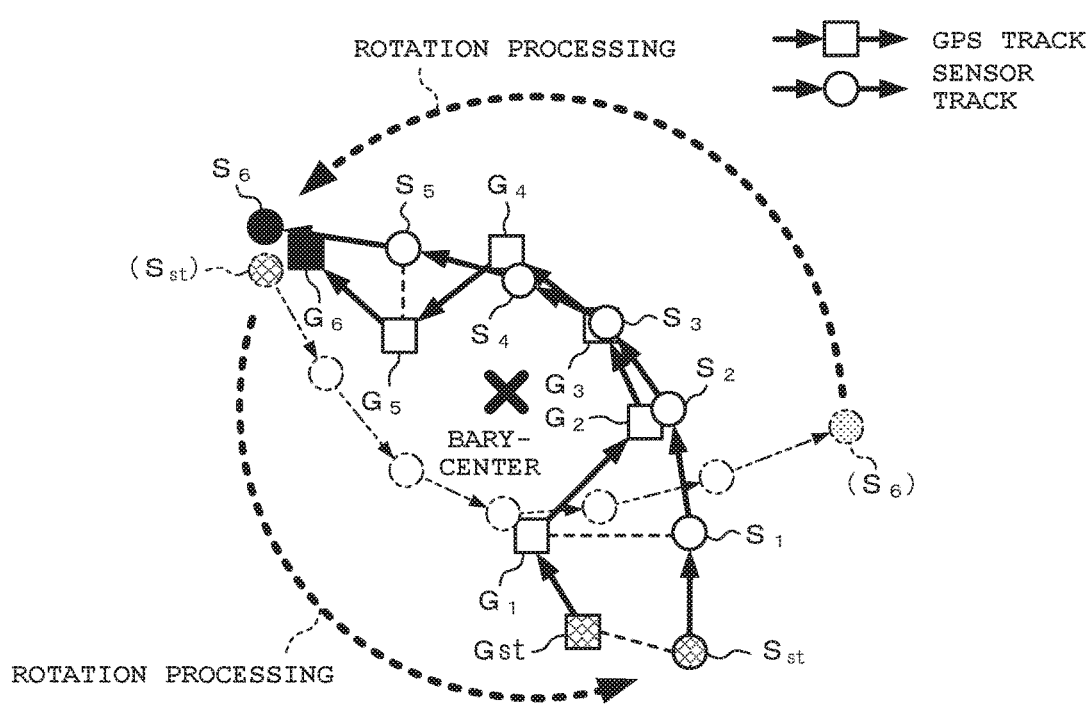
FIG. 12 is a schematic diagram showing an example of the sensor track rotation processing in the data analysis method according to the embodiment.
Figure 13:
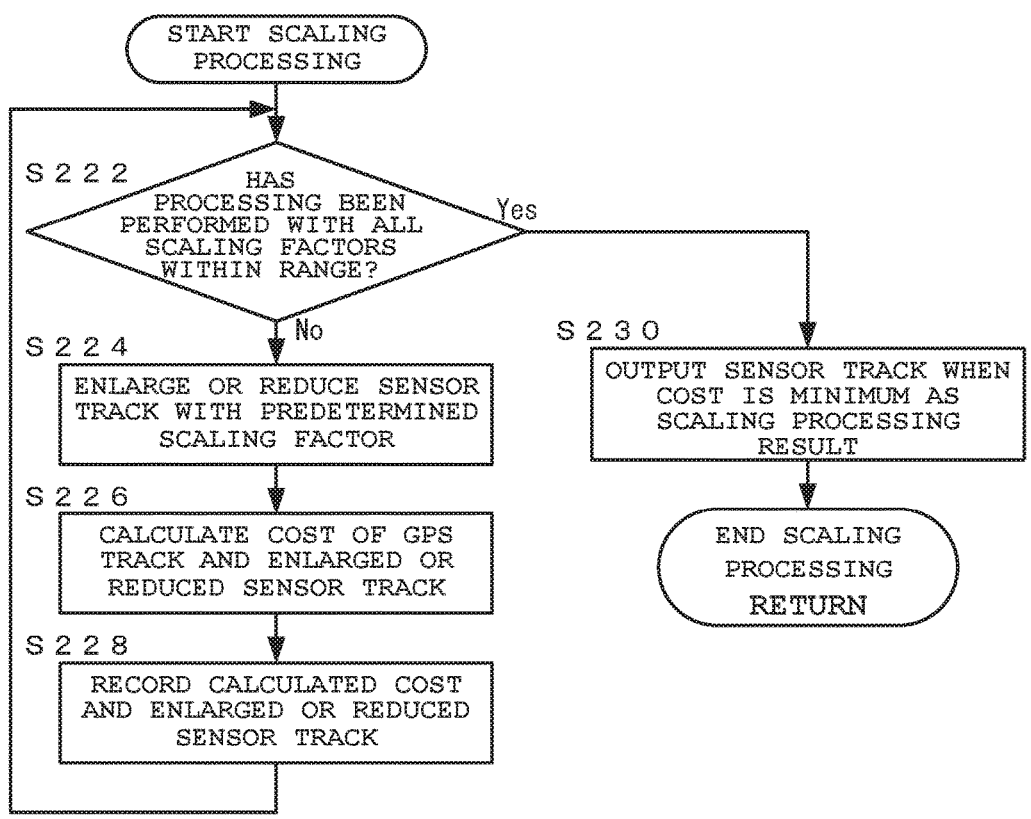
FIG. 13 is a flowchart of one example of sensor track scaling processing in the data analysis method according to the embodiment.
Figure 14:
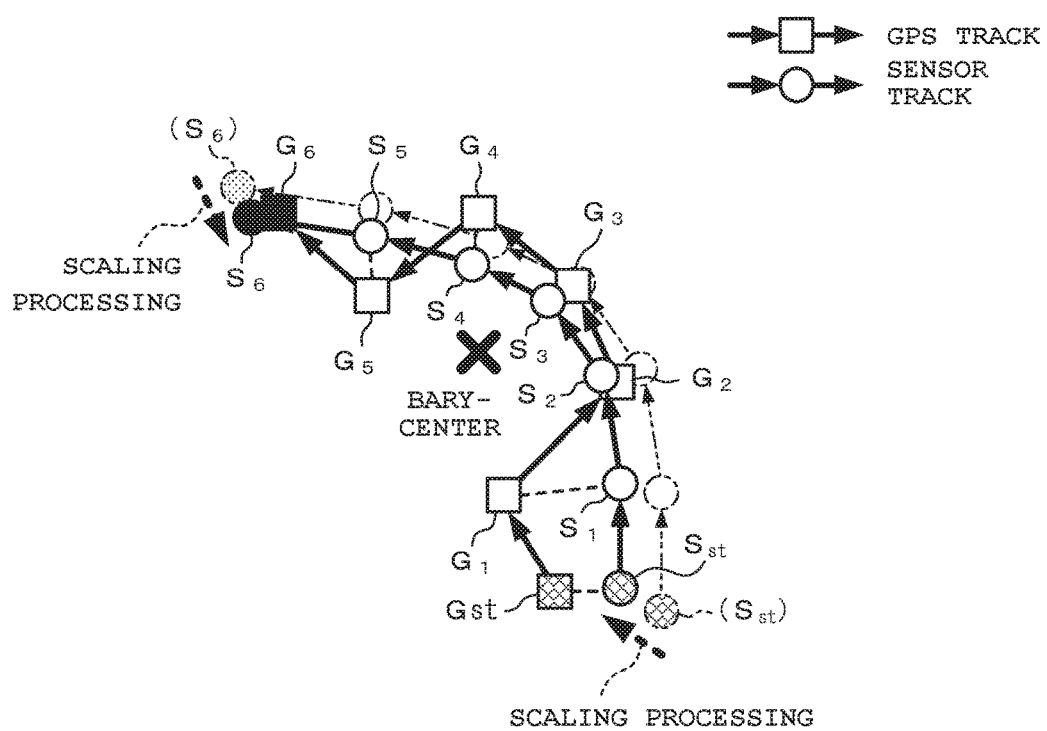
FIG. 14 is a schematic diagram showing an example of the sensor track scaling processing in the data analysis method according to the embodiment.
Figure 15:
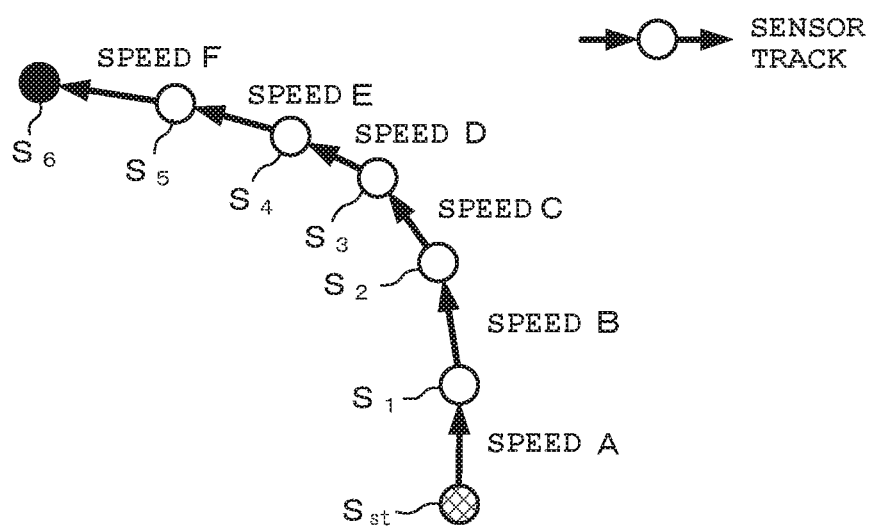
FIG. 15 is a schematic diagram showing an example of a sensor track estimated in the data analysis method according to the embodiment.
Figure 16:
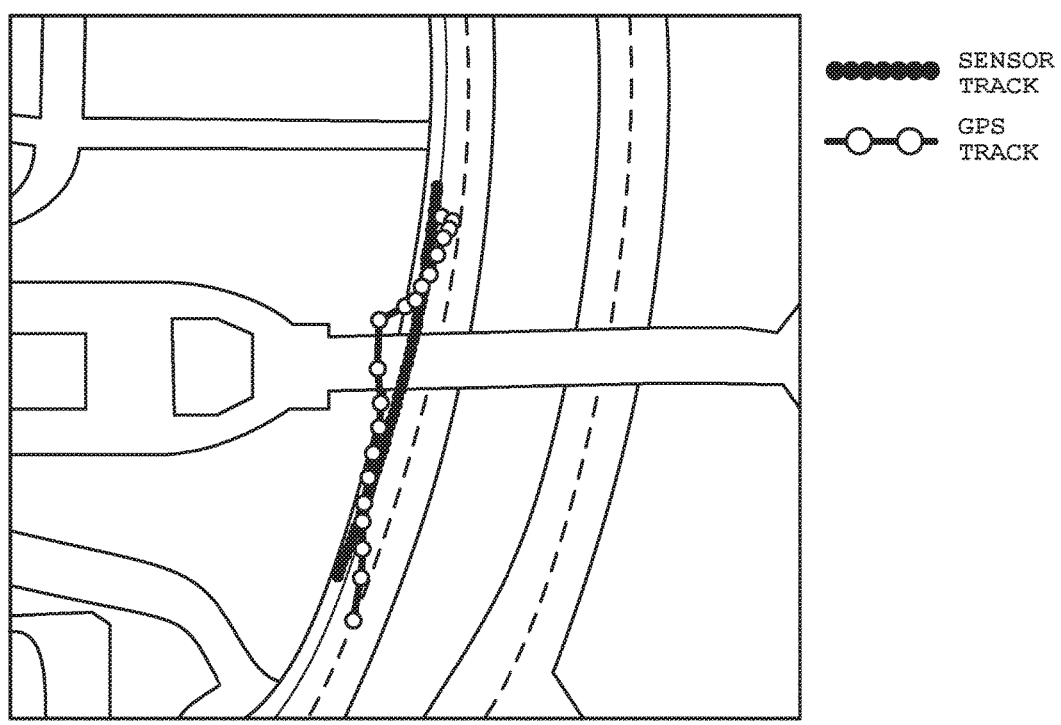
FIG. 16 is a schematic view for describing operations and effects in the data analysis method according to the embodiment.

FIG. 3 is a display example showing one example of a sensor data transfer procedure in a control method (data analysis method) for the exercise supporting apparatus according to the present embodiment. FIG. 4 is a flowchart of one example of the control method for the exercise supporting apparatus according to the present embodiment. FIG. 5 is a schematic diagram for describing a definition of one cycle in the data analysis method according to one embodiment. FIG. 6 is a schematic diagram for describing integral value calculation processing in the data analysis method according to the present embodiment. FIG. 7 is a schematic diagram for describing sensor data interpolation processing in the data analysis method according to the present embodiment. FIG. 8 is a schematic diagram for describing a method of obtaining a pseudo-speed in the data analysis method according to the present embodiment. FIG. 9A and FIG. 9B are schematic diagrams showing examples of a GPS track and a sensor track in the data analysis method according to the present embodiment. FIG. 10 is a schematic diagram of a state in which gravity positions of the GPS track and the sensor track coincide with each other, in the data analysis method according to the present embodiment. FIG. 11 is a flowchart of one example of sensor track rotation processing in the data analysis method according to the present embodiment. FIG. 12 is a schematic diagram showing an example of the sensor track rotation processing in the data analysis method according to the present embodiment. FIG. 13 is a flowchart of one example of sensor track scaling processing in the data analysis method according to the present embodiment. FIG. 14 is a schematic diagram showing an example of the sensor track scaling processing in the data analysis method according to the present embodiment. FIG. 15 is a schematic diagram showing an example of a sensor track estimated in the data analysis method according to the present embodiment. FIG. 16 is a schematic view for describing operations and effects in the data analysis method according to the present embodiment.

The control method (data analysis method) in the exercise supporting apparatus according to the present embodiment mainly includes a procedure of acquiring and accumulating various sensor data regarding an exercise status in a running exercise (sensor data collecting procedure) and a procedure of estimating and displaying indexes (movement track and moving speed) associated with the exercise status based on the accumulated sensor data (index estimating procedure). Here, processing operations in the index estimating procedure are achieved by the control section 340 of the data processing section 300 executing a predetermined algorithm program.

In the sensor data collecting procedure, first, the user US runs a predetermined running course or the like with the sensor device 100 being worn on the waist, as depicted in FIG. 1. Here, at the start of the running exercise, the user US operates the wrist device 200 worn on the wrist or the like, whereby an instruction signal for instructing to start logging is transmitted from the wrist device 200 to the sensor device 100. As a result, the control section 140 of the sensor device 100 starts measurements of sensor data by the acceleration measuring section 110, the angular velocity measuring section 120, and the GPS measuring section 130 (acceleration data, angular velocity data, and positioning data), and causes the sensor data to be sequentially stored in a predetermined area of the storage section 150 in association with time data. Then, when ending the running exercise, the user US operates the wrist device 200, whereby an instruction signal for instructing to end the logging is transmitted to the sensor device 100 to end the measurements of sensor data by the acceleration measuring section 110, the angular velocity measuring section 120, and the GPS measuring section 130. As a result, the sensor data indicating the user's motion status during the running exercise is accumulated in a predetermined storage area of the storage section 150 with them being associated with the time data.

Next, the sensor device 100 and the data processing section 300 are connected to each other via a USB cable or the like to perform communication, and thereby cause the sensor data accumulated during the running exercise to be transferred from the sensor device 100 to the data processing section 300 for storage in the storage section 350. Here, when the sensor data is to be transferred from the sensor device 100 to the data processing section 300 (or after the sensor data is transferred and stored in the storage section 350), the user US uses the input operating section 310 and inputs various running information at the time of the acquisition of the sensor data, with reference to the sensor data displayed on the display section 320. Specifically, item information, such as a running method at the time of the running exercise (such as a training menu), course conditions (such as a course type, a running distance, the number of trials, and comments), and the user's name, is inputted on the input screen displayed on the display section 320, as depicted in FIG. 3. As a result, the sensor data transferred from the sensor device 100 is associated with each trial and stored in the storage section 350.

Next, the control section 340 of the data processing section 300 performs axis correction processing on the acceleration data in the motion data of the sensor data stored in the storage section 350. Here, generally, the sensor device 100 worn on the trunk of the body is affected by the shake and tilt of the upper body during a running exercise, the axis in the gravity direction and the axis of the acceleration of the body in the up-and-down direction detected by the sensor device 100 have a difference. Accordingly, based on the values of the angular velocity data acquired by the sensor device 100, a correction is required to be made so as to cancel difference components in the axial direction which differ with time.

In the axis correction processing, the control section 340 first estimates a gravity direction at each clock time based on the angular velocity data acquired by the sensor device 100. Subsequently, the control section 340 corrects the value of the acceleration data by rotating each axis of the acceleration data such that the estimated gravity direction and the acceleration data coincide with each other in the up-and-down direction. Then, the control section 340 causes the corrected acceleration data and the angular velocity data to be stored in a predetermined storage area of the storage section 350 as corrected sensor data.

Next, in the index estimating procedure, the control section 340 analyzes the above-described corrected sensor data and obtains a movement track and a moving speed (running speed) as indexes associated with the exercise status at the time of the running exercise. Here, in the present embodiment, a series of processing for obtaining a movement track and a moving speed (estimation processing) is automatically performed without the user US performing a special input operation.

Specifically, by the user US operating the input operating section 310 of the data processing section 300 to start index estimation processing, the control section 340 executes a predetermined algorithm program (data analysis program) to cause a plurality of pieces of trial data stored in the storage section 350 to be displayed on the display section 320 in, for example, a list format or table format as depicted in FIG. 3. Each piece of trial data displayed on the display section 320 is associated with the sensor data (including the above-described corrected sensor data) transferred from the sensor device 100.

Next, the user US operates the input operating section 310 to select trial data to be subjected to the index estimation processing, from among the plurality of pieces of trial data displayed on the display section 320. As a result, sensor data associated with the selected trial data is read out from the storage section 350, as depicted in the flowchart of FIG. 4. Specifically, of the sensor data associated with the selected trial data, the control section 340 acquires an acceleration component in a propelling direction of the acceleration data (hereinafter referred to as "propelling-direction acceleration"), an angular velocity component of the angular velocity data around the vertical axis (hereinafter referred to as "angular velocity around the vertical axis"), and positioning data by GPS (Step S102). Note that the vertical axis herein is an axis indicating the gravity axis perpendicular to the ground surface.

Next, the control section 340 calculates an integral value (relative speed) for each cycle of the acquired propelling-direction acceleration and an integral value (relative angle) for each cycle of the acquired angular velocity around the vertical direction (Step S104). Here, one cycle in the present embodiment is defined as a period of two steps from timing when one foot lands as a starting point to timing when the same foot as that at the starting point lands after an advance by two steps, among landing timings of the left and right feet detected in acceleration data in the up-and-down direction repeating cyclic changes when the user US performs an exercise involving movements such as a running exercise, as depicted in FIG. 5.

An example of the case in which this integral value calculation processing is performed on the propelling-direction acceleration in a predetermined period is depicted in FIG. 6. Here, values of the propelling-direction acceleration for ten seconds are represented by a broken line, and values obtained by integrating the values of the propelling-direction acceleration for each cycle are represented by a solid line. By performing integration for each cycle in this manner, cyclic data fluctuations in each cycle can be cancelled for both of the propelling-direction acceleration and the angular velocity about the vertical axis, and a relative speed and a relative angle in each cycle can be obtained.

Next, based on the values of the relative speed and the relative angle obtained for each cycle, the control section 340 generates interpolation sensor data at timing matching with a time when the positioning data is acquired by GPS (represented as "GPS observation cycle" in FIG. 7) so as to perform linear interpolation processing (Step S106). Here, in FIG. 7, the relative speed and the relative angle are collectively represented as sensor data or interpolation sensor data for convenience of explanation. In the present embodiment, as a method of linear interpolation processing, the sensor data is interpolated so as to match with the time when the positioning data is acquired by GPS. However, the positioning data acquired by GPS may be interpolated so as to match with a time when the sensor data is acquired (represented as "running cycle" in FIG. 7).

Next, the control section 340 judges whether the following series of processing operations (Steps S110 to S130) have been performed on data at a designated time for all pieces of sensor data acquired for the selected trial data (Step S108). If the processing on all of the pieces of sensor data has not been completed (No at Step S108), the control section 340 repeatedly performs the following series of processing operations (Step S110 to S130). On the other hand, if the processing on all of the pieces of sensor data has been completed (Yes at Step S108), the control section 340 ends the index estimation processing.

Specifically, the control section 340 first acquires sensor data of a predetermined time width, with a time obtained by advancing the previous processing start time by a predetermined time as a starting point (Step S110). Here, the predetermined time is set based on the accuracy of positioning (observation) by GPS. For example, observation accuracy tends to be degraded when the number of GPS satellites that can receive GPS signals is small, when the signal intensity is weak, and the like. Therefore, the time width should preferably be set to be slightly long. In the present embodiment, a time width in which pieces of positioning data at ten to thirty points can be acquired is set. Note that the predetermined time for advancing time from the previous processing start time and the predetermined time width for acquiring sensor data may be set differently.

Next, the control section 340 converts the latitude and longitude (absolute position) of each point in the positioning data by GPS into plane rectangular coordinates as a meter space, and obtains a movement track (hereinafter represented as a "GPS track"; first movement track) indicating changes of the absolute position of the user US by GPS with time (Step S112). Here, as a method of converting a latitude and longitude into plane rectangular coordinates, for example, a method of conversion into plane rectangular coordinates provided by Geospatial Information Authority of Japan can be adopted. Also, another method may be adopted in which, if an error can be tolerated to some extant, the earth is regarded as a sphere and a position in Y direction (or X direction) is obtained from the product of the tangent of a difference between latitudes (or longitudes) at two points and the equatorial radius in the coordinate-converted movement track.

Next, the control section 340 judges whether there are estimated moving speeds in the previous series of processing operations (Steps S110 to S130) (Step S114). When judged that there are moving speeds previously estimated (Yes at Step S114), the control section 340 obtains an average value (average speed) of the moving speeds (Step S116). On the other hand, when there are no previously-estimated moving speeds (No at Step S114), the control section 340 obtains an average speed from a distance between points and its required time in the above-described obtained GPS track (Step S118).

Next, the control section 340 obtains a pseudo-speed by adding a relative speed obtained for each cycle to the average speed obtained as described above as a base speed (Step S120), as depicted in FIG. 8. Here, if the base speed (average speed) is equal to an average speed of target data for this index estimation processing (moving speed estimation processing), the control section 340 can determine the obtained pseudo-speed as an estimated speed in this series of processing operations (Steps S110 to S130). However, the base speed is not necessarily equal to the average speed of the target data. Therefore, the base speed is estimated not to be equal to a moving speed estimated in this series of processing operations (estimated speed) but to be a relatively approximate value, and is represented herein as a pseudo-speed.

Next, from the relative angle obtained for each cycle and the above-described pseudo-speed, the control section 340 obtains a movement track (hereinafter referred to as "sensor track"; second movement track) indicating relative changes of the position of the user US with time (Step S122). Specifically, the control section 340 obtains a sensor track by determining a direction for advancing from a certain point to the next point based on a relative angle between these two points and obtaining a distance from the above-described pseudo-speed and required time. Examples of the GPS track and the sensor track (schematic diagram) obtained by the method as described above are depicted in FIG. 9A and FIG. 9B. Here, FIG. 9A shows an example of the GPS track, and FIG. 9B shows an example of the sensor track. In these tracks, point $G_{st}$ and point $S_{st}$, point G1 and point S1, point G2 and point S2, . . . point G6 and point S6 are points at the same time, respectively.

Next, the control section 340 matches the gravity positions of the obtained GPS track and sensor track on the same plane rectangular coordinates (Step S124), as depicted in FIG. 10. Here, as a parameter indicating a degree of approximation between the GPS track and sensor track, a concept "cost (distance cost)" is introduced. In the processing operation of approximating the sensor track to the GPS track (Steps S124 to S128), the control section 340 calculates this cost to verify a degree of approximation between the GPS track and the sensor track. Specifically, this cost (distance cost) is represented by a total sum of distances between points in the GPS track and the sensor track at the same time (between points $G_{st}$ and $S_{st}$, between points G1 and S1, between points G2 and S2, . . . between points G6 and S6). In FIG. 10, the distance cost corresponds to a total sum of lengths of broken lines each connecting points at the same time.

Next, in order to approximate the sensor track to the GPS track, the control section 340 performs rotation processing of rotating the sensor track around the gravity position (Step S126). In the rotation processing, the control section 340 first judges whether processing of rotating the sensor track at all rotation angles in a range previously set has been performed (Step S202), as depicted in the flowchart of FIG. 11. Here, as for the range of the rotation angle for use in rotation processing, when the result of the previously-performed rotation processing (rotation angle of the sensor track at a minimum cost) can be obtained, only angles near the result (for example, a range of the previous rotation angle ±10°) may be set as a rotation range. When the result of the previous rotation processing cannot be obtained, for example, the entire perimeter (0° to 360°) may be set as a rotation range. Also, if the sensor device 100 includes the geomagnetic sensor and a geomagnetic value has been obtained to allow an approximate azimuth to be clarified, this azimuth may be taken as a reference and only angles near a specific azimuth may be set as a rotation range.

If the rotation processing at all rotation angles in the set range has not been completed (No at Step S202), the control section 340 rotates the sensor track by a predetermined angle (Step S204), as indicated by arrows with broken lines in FIG. 12. Here, the predetermined angle for the rotation of the sensor track depends on accuracy in the degree of approximation based on the cost when the rotation processing is performed, the degree of load of calculation processing in the control section 340, and the like. For example, the rotation angle should preferably be changed by about 1° to 5°.

Then, the control section 340 calculates a cost between the GPS track and the rotated sensor track (Step S206), and stores the calculated cost and the rotated sensor track in association with each other in a predetermined storage area of the storage section 350 (Step S208). Then, returning to Step S202, the control section 340 repeatedly performs the series of the processing operations (Steps S204 to S208) until the rotation processing at all rotation angles in the set range is completed. Then, when the rotation processing at all rotation angles is completed (Yes at Step S202), the control section 340 extracts a minimum cost from among costs calculated for each rotation angle of the sensor track and stored in the storage section 350, and outputs a sensor track stored in association with the cost as a result of the rotation processing (Step S210), as depicted in FIG. 12.

In the present embodiment, as a method for approximating the sensor track to the GPS track by using rotation processing, rotation processing at all rotation angles in the predetermined set range is performed, and a search is made for a sensor track at a rotation angle at a minimum cost. However, the present invention is not limited thereto. For example, a search may be made for a rotation angle at a minimum cost by applying an optimizing method of obtaining a minimum value based on the tilt (first-order differential coefficient) of a specific function (here, a function indicating changes in cost), such as a known steepest descent method.

Next, in order to further approximate the sensor track to the GPS track, the control section 340 performs scaling processing of enlarging or reducing the sensor track (Step S128). In the scaling processing, the control section 340 first judges whether processing of enlarging or reducing the sensor track with all scaling factors in a range previously set has been performed (Step S222), as depicted in the flowchart of FIG. 13. Here, as for the range of enlargement/reduction factors for use in the scaling processing, in a case where the result of the previously-performed scaling processing (enlargement/reduction factor of the sensor track at a minimum cost) can be obtained, only angles near the result (for example, a range of the previous enlargement/reduction factor ±0.5 folds) should preferably be set as a scaling factor range. In a case where the result of the previous scaling processing cannot be obtained, if an exercise with small changes in speed, such as a running exercise or marathon, is a target, a range approximately from 0.5 folds (reduction) to two folds (enlargement) should preferably be set as a scaling factor range. Also, when an exercise with large changes in speed is a target, a scaling factor range exceeding the above-described range may be set.

If the scaling processing with all scaling factors in the set range has not been completed (No at Step S222), the control section 340 enlarges or reduces the sensor track at a predetermined scaling factor (Step S224), as indicated by arrows with broken lines in FIG. 14. Here, the predetermined scaling factor for enlarging or reducing the sensor track depends on accuracy in the degree of approximation based on the cost when the scaling processing is performed, the degree of load of calculation processing in the control section 340, and the like. For example, the scaling factor should preferably be changed by 0.1 folds.

Then, the control section 340 calculates a cost between the GPS track and the enlarged or reduced sensor track (Step S226), and stores the calculated cost and the enlarged or reduced sensor track in association with each other in a predetermined storage area of the storage section 350 (Step S228). Then, returning to Step S222, the control section 340 repeatedly performs the series of the processing operations (Steps S224 to S228) until the scaling processing at all scaling factors in the set range is completed. Then, when the rotation processing at all scaling factors is completed (Yes at Step S222), the control section 340 extracts a minimum cost from among costs calculated for each scaling factor of the sensor track and stored in the storage section 350, and outputs a sensor track stored in association with the cost as a result of the scaling processing (Step S230), as depicted in FIG. 14.

In the present embodiment, as a method of approximating the sensor track to the GPS track by using the scaling processing, scaling processing at all scaling factors in the range previously set is performed, and a search is made for a sensor track at a scaling factor at a minimum cost. However, the present invention is not limited thereto. For example, as with the above-described rotation processing, a search may be made for an enlargement/reduction factor at a minimum cost by applying an optimizing method, such as a known steepest descent method.

Next, for the sensor track outputted as the result of the above-described rotation processing and scaling processing, the control section 340 obtains moving speeds between every two points from distances between every two points and times required for movement between every two points, (Step S130). Specifically, for the sensor track estimated so as to approximate to the GPS track by the rotation processing and the scaling processing, moving speeds between every two points (speeds A, B, . . . F) are obtained based on distances between every adjacent two points (between points $S_{st}$ and S1, between points S1 and S2, . . . between points S5 and S6) and times required for movement in each distance, as depicted in FIG. 15. Then, the obtained moving speeds are stored in association with the estimated movement track in a predetermined storage area of the storage section 350.

Here, regarding the quality of accuracy in a GPS track obtained when the user actually runs a half-marathon course and a sensor track estimated by using the above-described index estimation processing, verification is performed by using actually-measured data. In half marathon, a total moving distance (that is, correct distance) that the user actually runs is 21.0975 km. By contrast, in a GPS track based on positioning data acquired by GPS during course running (FIG. 16 shows an example of a movement track between specific two points), a total moving distance calculated by accumulating distances between every two points is 21.5541 km, and a difference from the actual total moving distance (correct distance) is 456.6 m. On the other hand, in a sensor track estimated based on sensor data (acceleration data and angular velocity data) acquired by the sensor device 100 by using the above-described index estimation processing, a total moving distance calculated by accumulating distances between every two points is 21.0258 km, and a difference from the actual total moving distance (correct distance) is 71.7 m. That is, a result obtained in the sensor track estimated based on the sensor data acquired while the user is running by using the index estimation processing according to the present embodiment is more approximate to the actual moving distance, compared with the GPS track.

Next, the control section 340 causes indexes for grasping the exercise status, such as a moving speed obtained based on the sensor track estimated by using the above-described index estimating processing and a pitch and stride obtained on the basis of a distance between two points based on the estimated sensor track and landing timing obtained based on acceleration changes, to be displayed on the display section 320 in an arbitrary format, such as numerical values, a graph, or a table. Note that the control section 340 may cause these indexes to be displayed in association with, for example, the sensor track displayed on a map.

As described above, in the present embodiment, processing is performed in which a sensor track based on acceleration data and angular velocity data acquired during a running exercise by the sensor device 100 worn on the user US is approximated to a GPS track based on positioning data acquired by GPS. Then, based on the processing result, a distance between two points and a speed during the running exercise are obtained. Here, as a method of approximating the sensor track to the GPS track, for example, a method of minimizing a total sum (cost) of distances between points at the same time for the GPS track and the sensor track by rotating or enlarging/reducing the sensor track is adopted. As a result, by using the sensor track estimated so as to be approximated to the GPS track, a distance between two points and a speed during the running exercise can be accurately obtained, compared with the case where only the positioning data acquired by GPS is used. Accordingly, by viewing indexes such as the above-described movement track, moving speed, and the like provided in a predetermined display format through the display section 320, the user can accurately grasp the exercise status during the running exercise and can judge and improve the exercise status.

First Modification Example

Next, a modification example of the above-described embodiment is described.

Figure 17:
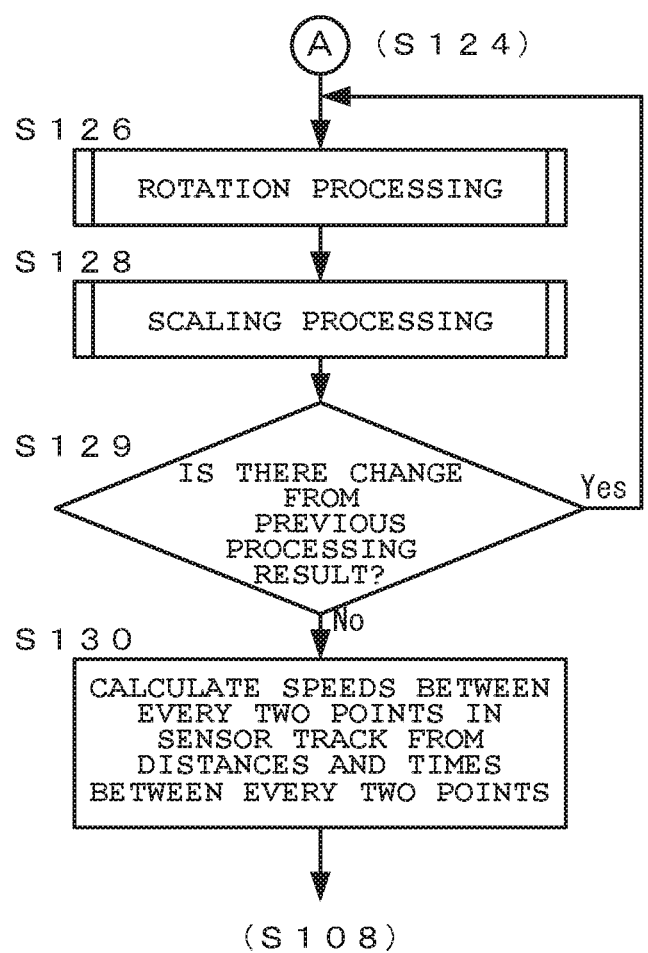
FIG. 17 is a flowchart showing a main portion of another example (first modification example) of the control method for the exercise supporting apparatus according to the embodiment.

FIG. 17 is a flowchart showing a main portion of another example (first modification example) of the control method for the exercise supporting apparatus according to the present embodiment. Here, processing operations similar to those in the above-described embodiment (refer to FIG. 4) are not described.

In the above-described embodiment, the rotation processing (Step S126) and the scaling processing (Step S128) are each performed once in the series of processing operations in the index estimation processing (refer to FIG. 4). However, the present invention is not limited thereto. That is, a configuration where only one of the above-described rotation processing and scaling processing is performed may be adopted as long as the degree of approximation between a GPS track and a sensor track can be ensured to some extent. In the above-described embodiment, when the rotation processing and the scaling processing are each performed once, a movement track and a moving speed of the user can be accurately estimated, and the processing load on the control section 340 can be decreased as much as possible for quick processing. Here, when the degree of approximation between the GPS track and the sensor track is low and estimation accuracies of the movement track and the moving speed of the user are not sufficient or when the movement track and the moving speed are desired to be further accurately estimated, a control method can be adopted in which the rotation processing and the scaling processing are each repeatedly performed a plurality of times.

Specifically, as with the above-described embodiment (refer to FIG. 4), after obtaining a GPS track based on positioning data acquired by GPS and a sensor track based on acceleration data and angular velocity data and superimposing the gravity positions of these tracks with each other (Step S124), the control section 340 performs the rotation processing (Step S126) and the scaling processing (Step S128), as depicted in the flowchart of FIG. 17. Then, the control section 340 judges whether the results of the rotation processing and the scaling processing performed this time have been changed from the results of the previous rotation processing and scaling processing (Step S129). Here, a judgment whether the results of the rotation processing and the scaling processing have been changed is made based on, for example, whether the sensor tracks at a minimum cost or the rotation angles and the enlargement/reduction factors have a change between the previous time and this time or whether a difference therebetween is equal to or smaller than (converges to) a threshold set in advance. When the control section 340 judges that the processing results have a change (Yes at Step S129) or cannot obtain the results of the previous rotation processing and scaling processing, the control section 340 returns to Step S126 and repeatedly performs the rotation processing and the scaling processing on the sensor track. Then, when the control section 340 judges that the processing results do not have a change or converged (No at Step S129), the control section 340 obtains, for the sensor track outputted as the results of the immediately-preceding rotation processing and scaling processing, a moving speed between every two points from a distance between every adjacent two points and a time required for movement between these two points (Step S130).

Second Modification Example

Figure 18:
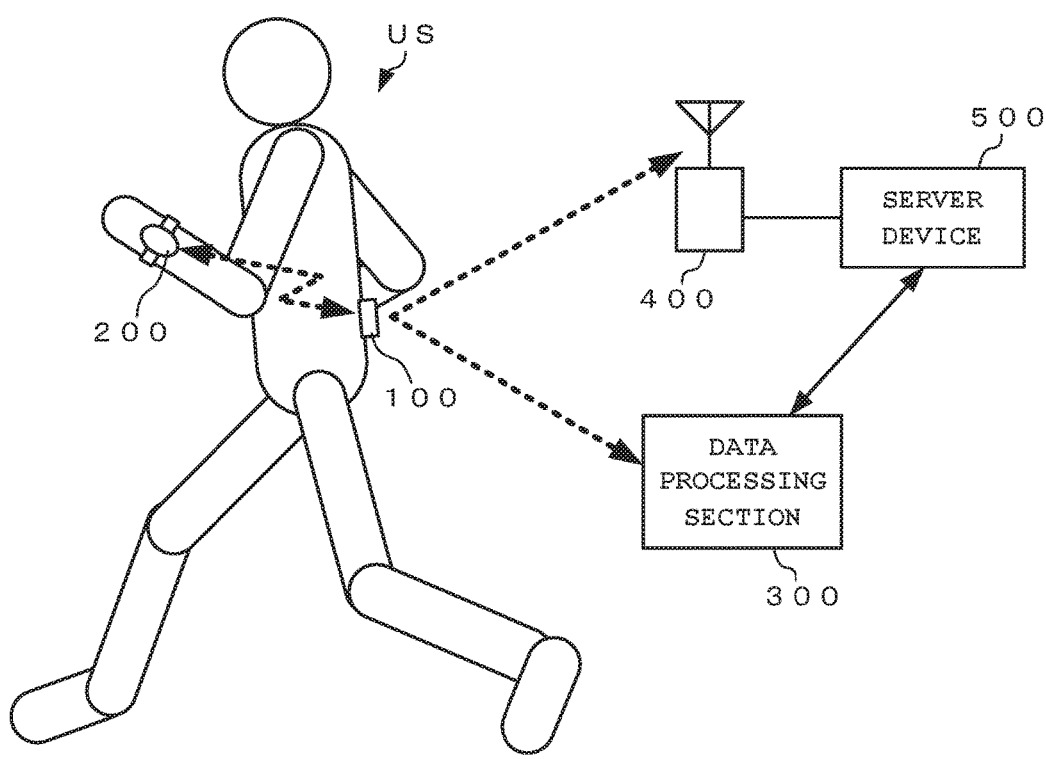
FIG. 18 is a schematic structural diagram showing still another example (second modification example) of the exercise supporting apparatus according to the embodiment.

FIG. 18 is a schematic structural diagram showing still another example (second modification example) of the exercise supporting apparatus according to the present embodiment. Here, sections similar to those in the above-described embodiment (refer to FIG. 1) are not described.

In the above-described embodiment, sensor data during a running exercise is measured and accumulated by the sensor device 100, and indexes such as a movement track and a moving speed are estimated by the data processing section 300 after the end of the exercise and provided to the user in a predetermined display format. However, the present invention is not limited thereto. That is, the exercise supporting apparatus may include a server device 500 and/or a cloud system connected to a network, as depicted in FIG. 18.

Specifically, sensor data acquired by the sensor device 100 during a running exercise is transferred via the data processing section 300 and a network relay section 400 to the server device 500. In the server device 500, the above-described index estimation processing is performed. Then, the user US operates the data processing section 300 to connect to the network and/or the server device 500 and cause information based on the results of the index estimation processing to be displayed on the display section 320 in a predetermined format, and thereby accurately grasps the exercise status during the running exercise. Here, as the data processing section 300, it is possible to adopt a communication terminal with a simple structure having a function for connecting to the network and/or the server device 500 to cause information based on the results of the index estimation processing to be displayed. That is, in the present modification example, functions equivalent to those of the data processing section in the above-described embodiment are achieved by a structure including the data processing section 300, the network and the server device 500.

In the above-described embodiment and the modification examples, as a method for approximating a sensor track to a GPS track, the rotation processing and the scaling processing are performed. However, the present invention is not limited thereto. For example, another method may be adopted, such as DP (Dynamic Programming) matching using dynamic programming capable of efficiently performing calculation by re-using a result of previous calculation and calculating similarity while associating components of two patterns.

Also, in the above-described embodiment and the modification examples, the control method premised on offline processing has been described, in which sensor data acquired by the sensor device 100 during a running exercise of the user US is transferred to the data processing section 300 after the exercise so as to obtain (estimate) a movement track and a moving speed. However, the present invention is not limited thereto. For example, the processing may be performed online such that, after sensor data for a predetermined time period is acquired by the sensor device 100, the sensor data is transferred from the sensor device 100 to the data processing section 300 by using wireless communication to obtain a movement track and a moving speed. In this case, indexes such as the obtained movement track and moving speed can be provided by being displayed on the display section 320 of the data processing section 300 and/or the display section 220 of the wrist device 200 in substantially real time while the user US is running.

While the present invention has been described with reference to the preferred embodiments, it is intended that the invention be not limited by any of the details of the description therein but includes all the embodiments which fall within the scope of the appended claims.

What is claimed is:

1. A data analysis device comprising:
a GPS (Global Positioning System) sensor that intermittently acquires and outputs positioning data including, as geographical position information of a user when the user travels, values of a latitude and a longitude by using Global Positioning System;
an acceleration sensor that detects acceleration components of the user when the user travels and outputs them as acceleration data;
an angular velocity sensor that detects angular velocity components of the user and outputs them as angular velocity data;
at least one processor; and
a memory storing instructions that, when executed by the at least one processor, control the at least one processor to:
obtain a first movement track indicating a change of a position of a user between two different clock times based on the values of the latitude and the longitude in the positioning data output by the GPS sensor;
obtain a second movement track indicating a relative change of the position of the user between the two different clock times based on motion data including the acceleration data and the angular velocity data, wherein the instructions control the at least one processor to obtain the second movement track based on a relative speed obtained by integrating the acceleration data and a relative angle obtained by integrating the angular velocity data;
approximate the second movement track to the first movement track by performing, as a deformation process, a rotation process, and at least one of an enlargement process and a reduction process, on the second movement track, based on a comparison in a same coordinate system between positions in the first movement track and the second movement track at a certain clock time between the two clock times; and obtain, based on a track obtained by performing the deformation process on the second movement track, a moving distance of the user between the two clock times, wherein the instructions further control the at least one processor to:

perform the deformation process on a plurality of first positions in the first movement track and a plurality of second positions in the second movement track at a plurality of different clock times between the two clock times such that a total sum of distances between each first position and each second position at a same clock time of the plurality of clock times is minimum, and in the deformation process, (i) perform the rotation process such that barycenter positions of the first movement track and the second movement track coincide with each other and the second movement track is rotated with respect to the first movement track so that the total sum of the distances is minimum, and (ii) perform the enlargement process or the reduction process on the second movement track after performing the rotation process such that the total sum of the distances is minimum.

2. The data analysis device according to claim 1, wherein the instructions further control the at least one processor to:

obtain, based on a distance between two points away from each other on the track obtained by performing the deformation process on the second movement track and a time required for movement between the two points, a moving speed between the two points.

3. The data analysis device according to claim 2, wherein the instructions further control the at least one processor to:

provide the obtained moving speed in a certain format on a display, as an exercise index indicating the motion status of the user.

4. The data analysis device according to claim 1, further comprising:

a display that provides in a certain format on a display an exercise index indicating the motion status of the user.

5. A non-transitory computer-readable storage medium storing instructions which, when executed by at least one processor, control the at least one processor to:

control a GPS (Global Positioning System) sensor to intermittently acquire and output positioning data including, as geographical position information of a user when the user travels, values of a latitude and a longitude by using Global Positioning System;

control an acceleration sensor to detect acceleration components of the user when the user travels and output them as acceleration data;

control an angular velocity sensor to detect angular velocity components of the user and output them as angular velocity data;

obtain a first movement track indicating a change of a position of a user between two different clock times based on the values of the latitude and the longitude in the positioning data output by the GPS sensor;

obtain a second movement track indicating a relative change of the position of the user between the two different clock times based on motion data including the acceleration data and the angular velocity data, wherein the instructions control the at least one processor to obtain the second movement track based on a relative speed obtained by integrating the acceleration data and a relative angle obtained by integrating the angular velocity data;

approximate the second movement track to the first movement track by performing, as a deformation process, a rotation process, and at least one of an enlargement process and a reduction process, on the second movement track, based on a comparison in a same coordinate system between positions in the first movement track and the second movement track at a certain clock time between the two clock times; and obtain, based on a track obtained by performing the deformation process on the second movement track, a moving distance of the user between the two clock times, wherein the instructions further control the at least one processor to:

perform the deformation process on a plurality of first positions in the first movement track and a plurality of second positions in the second movement track at a plurality of different clock times between the two clock times such that a total sum of distances between each first position and each second position at a same clock time of the plurality of clock times is minimum, and in the deformation process, (i) perform the rotation process such that barycenter positions of the first movement track and the second movement track coincide with each other and the second movement track is rotated with respect to the first movement track so that the total sum of the distances is minimum, and (ii) perform the enlargement process or the reduction process on the second movement track after performing the rotation process such that the total sum of the distances is minimum.

6. The non-transitory computer-readable storage medium according to claim 5, wherein the instructions further control the at least one processor to:

obtain, based on a distance between two points away from each other on the track obtained by performing the deformation process on the second movement track and a time required for movement between the two points, a moving speed between the two points.

7. The non-transitory computer-readable storage medium according to claim 6, wherein the instructions further control the at least one processor to:

provide the obtained moving speed in a certain format on a display, as an exercise index indicating the motion status of the user.

8. A data analysis system comprising:

a GPS (Global Positioning System) sensor that intermittently acquires and outputs positioning data including, as geographical position information of a user when the user travels, values of a latitude and a longitude by using Global Positioning System;

an acceleration sensor that detects acceleration components of the user when the user travels and outputs them as acceleration data;

an angular velocity sensor that detects angular velocity components of the user and outputs them as angular velocity data; and a data analysis device comprising:

at least one processor which is communicably connected to the GPS sensor, the acceleration sensor, and the angular velocity sensor; and a memory storing instructions that, when executed by the at least one processor, control the at least one processor to:

obtain a first movement track indicating a change of a position of a user between two different clock times based on the values of the latitude and the longitude in the positioning data output by the GPS sensor;

obtain a second movement track indicating a relative change of the position of the user between the two different clock times based on motion data including the acceleration data and the angular velocity data, wherein the instructions control the at least one processor to obtain the second movement track based on a relative speed obtained by integrating the acceleration data and a relative angle obtained by integrating the angular velocity data;

approximate the second movement track to the first movement track by performing, as a deformation process, a rotation process, and at least one of an enlargement process and a reduction process, on the second movement track, based on a comparison in a same coordinate system between positions in the first movement track and the second movement track at a certain clock time between the two clock times; and obtain, based on a track obtained by performing the deformation process on the second movement track, a moving distance of the user between the two clock times, wherein the instructions further control the at least one processor to:

perform the deformation process on a plurality of first positions in the first movement track and a plurality of second positions in the second movement track at a plurality of different clock times between the two clock times such that a total sum of distances between each first position and each second position at a same clock time of the plurality of clock times is minimum, and in the deformation process, (i) perform the rotation process such that barycenter positions of the first movement track and the second movement track coincide with each other and the second movement track is rotated with respect to the first movement track so that the total sum of the distances is minimum, and (ii) perform the enlargement process or the reduction process on the second movement track after performing the rotation process such that the total sum of the distances is minimum.

9. The data analysis system according to claim 8, the data analysis device further comprising:

a display that provides in a certain format on a display an exercise index indicating the motion status of the user.

10. A data analysis method comprising:

controlling a GPS (Global Positioning System) sensor to intermittently acquire and output positioning data including, as geographical position information of a user when the user travels, values of a latitude and a longitude by using Global Positioning System;

controlling an acceleration sensor to detect acceleration components of the user when the user travels and output them as acceleration data;

controlling an angular velocity sensor to detect angular velocity components of the user and output them as angular velocity data;

obtaining a first movement track indicating a change of a position of a user between two different clock times based on the values of the latitude and the longitude in the positioning data output by the GPS sensor;

obtaining a second movement track indicating a relative change of the position of the user between the two different clock times based on motion data including the acceleration data and the angular velocity data, wherein the second movement track is obtained based on a relative speed obtained by integrating the acceleration data and a relative angle obtained by integrating the angular velocity data;

approximating the second movement track to the first movement track by performing, as a deformation process, a rotation process, and at least one of an enlargement process and a reduction process, on the second movement track, based on a comparison in a same coordinate system between positions in the first movement track and the second movement track at a certain clock time between the two clock times; and obtaining, based on a track obtained by performing the deformation process on the second movement track, a moving distance of the user between the two clock times, wherein the deformation process is performed on a plurality of first positions in the first movement track and a plurality of second positions in the second movement track at a plurality of different clock times between the two clock times such that a total sum of distances between each first position and each second position at a same clock time of the plurality of clock times is minimum, and in the deformation process, (i) the rotation process is performed such that barycenter positions of the first movement track and the second movement track coincide with each other and the second movement track is rotated with respect to the first movement track so that the total sum of the distances is minimum, and (ii) the enlargement process or the reduction process is performed on the second movement track after performing the rotation process such that the total sum of the distances is minimum.

\* \* \* \* \*